US012639646B2

(12) United States Patent
Siohan et al.

(10) Patent No.: US 12,639,646 B2
(45) Date of Patent: May 26, 2026

(54) BUILDING A PRAGMATIC ACTION-ITEM SYSTEM

(71) Applicant: Google LLC, Mountain View, CA (US)

(72) Inventors: Olivier Siohan, Mountain View, CA (US); Kishan Sachdeva, Mountain View, CA (US); Joshua Maynez, Mountain View, CA (US); Benyah Shaparenko, Mountain View, CA (US)

(73) Assignee: Google LLC, Mountain View, CA (US)

( * ) Notice: Subject to any disclaimer, the term of this patent is extended or adjusted under 35 U.S.C. 154(b) by 160 days.

(21) Appl. No.: 17/643,830

(22) Filed: Dec. 12, 2021

(65) Prior Publication Data

US 2023/0186198 A1     Jun. 15, 2023

Related U.S. Application Data

(60) Provisional application No. 63/265,193, filed on Dec. 9, 2021.

(51) Int. Cl.
G06Q 10/0631 (2023.01)
G06F 40/166 (2020.01)
(Continued)

(52) U.S. Cl.
CPC ... G06Q 10/063118 (2013.01); G06F 40/166 (2020.01); G06Q 10/103 (2013.01);
(Continued)

(58) Field of Classification Search
USPC ...................................................... 705/7.17
See application file for complete search history.

(56) References Cited

U.S. PATENT DOCUMENTS

| | | | | |
|---|---|---|---|---|
| 10,796,281 B2 * | 10/2020 | Gupta | ..................... | G10L 15/30 |
| 11,545,156 B2 * | 1/2023 | Zeng | ..................... | G06N 20/00 |

(Continued)

FOREIGN PATENT DOCUMENTS

| | | | | | |
|---|---|---|---|---|---|
| EP | 2665022 A1 * | 11/2013 | .......... | G06Q 10/109 |
| GB | 2603842 A * | 8/2022 | .......... | G06F 16/685 |
| IN | 201941054744 A | 7/2021 | | |

OTHER PUBLICATIONS

Sachdeva, Kishan, Joshua Maynez, and Olivier Siohan. "Action item detection in meetings using pretrained transformers." 2021 IEEE Automatic Speech Recognition and Understanding Workshop (ASRU). IEEE, 2021. (Year: 2021).*

(Continued)

*Primary Examiner* — Kristin E Gavin
(74) *Attorney, Agent, or Firm* — Honigman LLP; Brett A. Krueger; Grant Griffith

(57) ABSTRACT

A method includes obtaining a transcript of multiple dialog acts during a multi-party communication session and extracting, from the transcript, a plurality of extractive action items each associated with a task expected to be completed within a timeframe to begin after the multi-party communication session ends. The method also includes generating, using an abstractive action item identification model configured to receive the extractive action items extracted from the transcript, one or more abstractive action items. Each abstractive action item is associated with a respective group of one or more of the extractive action items that are associated with a same respective task. For each of the one or more abstractive action items, the method also includes presenting, in one or more graphical user interfaces, information related to the corresponding abstractive action item.

26 Claims, 7 Drawing Sheets

(51) Int. Cl.

| | |
|---|---|
| *G06Q 10/10* | (2023.01) |
| *G10L 15/06* | (2013.01) |
| *G10L 15/183* | (2013.01) |
| *G10L 15/22* | (2006.01) |

(52) U.S. Cl.
CPC .......... *G10L 15/063* (2013.01); *G10L 15/183* (2013.01); *G10L 15/22* (2013.01); *G10L 2015/223* (2013.01)

(56) References Cited

U.S. PATENT DOCUMENTS

| | | | | |
|---|---|---|---|---|
| 2012/0054642 | A1* | 3/2012 | Balsiger | G06Q 10/10 715/752 |
| 2013/0018651 | A1* | 1/2013 | Djordjevic | G06Q 10/00 704/9 |
| 2017/0147941 | A1* | 5/2017 | Bauer | G06N 20/10 |
| 2017/0161258 | A1* | 6/2017 | Astigarraga | G06F 16/951 |
| 2018/0211654 | A1* | 7/2018 | Jacobson | H04L 51/216 |
| 2018/0301141 | A1* | 10/2018 | Altaf | G06N 20/00 |
| 2019/0258704 | A1* | 8/2019 | Mertens | G10L 15/22 |
| 2019/0327103 | A1* | 10/2019 | Niekrasz | G10L 15/26 |
| 2020/0074294 | A1* | 3/2020 | Long | G06F 40/247 |
| 2020/0160278 | A1* | 5/2020 | Allen | G06Q 10/1095 |
| 2020/0286485 | A1* | 9/2020 | Steelberg | G10L 15/063 |
| 2020/0311122 | A1* | 10/2020 | Ramamurthy | G06Q 10/10 |
| 2020/0403818 | A1* | 12/2020 | Daredia | G10L 17/00 |
| 2021/0099317 | A1* | 4/2021 | Hilleli | G06F 40/295 |
| 2021/0375289 | A1* | 12/2021 | Zhu | G10L 15/22 |
| 2021/0375291 | A1* | 12/2021 | Zeng | G06Q 10/10 |
| 2022/0207392 | A1* | 6/2022 | Hou | G10L 15/26 |
| 2023/0024040 | A1* | 1/2023 | Muralidharan | G06N 3/045 |
| 2023/0082729 | A1* | 3/2023 | Religa | G06F 40/131 |

OTHER PUBLICATIONS

Kim, Joseph, and Julie A. Shah. "Improving team's consistency of understanding in meetings." IEEE Transactions on Human-Machine Systems 46.5 (2016): 625-637. (Year: 2016).*

Purver, Matthew, Patrick Ehlen, and John Niekrasz. "Detecting action items in multi-party meetings: Annotation and initial experiments." International Workshop on Machine Learning for Multimodal Interaction. Berlin, Heidelberg: Springer Berlin Heidelberg, 2006. (Year: 2006).*

Towards Automatic Minuting of Meeting, Bojar et. al 2019.

Indian Office Action for the related Application No. 202447050567 dated Jun. 8, 2025.

* cited by examiner

BUILDING A PRAGMATIC ACTION-ITEM SYSTEM

CROSS REFERENCE TO RELATED APPLICATIONS

This U.S. patent application claims priority under 35 U.S.C. § 119(e) to U.S. Provisional Application 63/265,193, filed on Dec. 9, 2021. The disclosure of this prior application is considered part of the disclosure of this application and is hereby incorporated by reference in its entirety.

TECHNICAL FIELD

This disclosure relates to building a pragmatic action-item system.

BACKGROUND

Action items capture the information decided in a meeting, and serve as an essential component of professional communications for stakeholders to align and agree on next steps. Participants in a meeting generally indicate action items to be the most important information in the meeting, rendering automated action item identification an often requested feature for notes-taking applications. Existing note-taking products and technologies solely focus on binary classification of dialog for identifying action items without leveraging the context of all the utterances spoken. These existing note-taking products and technologies also lack techniques to address low training data availability for training models to identify action items from dialog in meetings.

SUMMARY

One aspect of the disclosure provides a computer-implemented method that when executed on data processing hardware causes the data processing hardware to perform operations that include obtaining a transcript of multiple dialog acts during a multi-party communication session and extracting, from the transcript, a plurality of extractive action items each associated with a task expected to be completed within a timeframe to begin after the multi-party communication session ends. The operations also includes generating, using an abstractive action item identification model configured to receive the extractive action items extracted from the transcript, one or more abstractive action items. Each abstractive action item is associated with a respective group of one or more of the extractive action items that are associated with a same respective task. For each of the one or more abstractive action items, the operations also include presenting, in one or more graphical user interfaces, information related to the corresponding abstractive action item.

Implementations of the disclosure may include one or more of the following optional features. In some implementations, extracting the plurality of extractive action items includes: for each of the multiple dialog acts of the transcript, classifying, using an action item classification model configured to receive a respective sequence of dialog acts that includes the corresponding dialog act, the corresponding dialog act as either comprising an action item or not comprising an action item; and identifying each dialog act classified as comprising an action item as a respective one of the plurality of action items. Here, the action item classification model may include a pre-trained Bidirectional Encoder representations from Transformers (BERT) model or an extended transformer construction (ETC) model having a global-local attention mechanism.

In some examples, the abstractive action item identification model is trained on a set of training transcripts each including: a sequence of training dialog acts each corresponding to a transcribed utterance spoken by a single speaker during a multi-party communication; and one or more ground-truth abstractive action items. Here, each ground-truth abstractive action item indicates a respective span of sequential dialog acts from the sequence of training dialog acts that collectively indicate a respective task to be completed, one or more particular individuals responsible for completing the respective task, and a due date for completing the respective task. In these examples, a first dialog act and a last dialog act in the respective span of sequential dialog acts indicated by the ground-truth abstractive action item may each be associated with extractive action items. For instance, at least one dialog act between the first dialog act and the second dialog act in the respective span of sequential dialog acts may not be associated with an extractive action item. Additionally, generating the one or more abstractive action items may include clustering the extractive action items into one or more coherent groups, wherein each coherent group forms a respective one of the one or more abstractive action items.

In some implementations, the operations further include, for each abstractive action item generated, generating, using a text generation model, based on the respective group of the one or more extractive action items associated with the same respective task, a respective summary of the abstractive action item that concisely describes the respective task to be completed. In these implementations, presenting the information related to the corresponding action item includes presenting the respective summary of the corresponding abstractive action item. Moreover, while presenting the respective summary of the corresponding abstractive action item, the operations may further include receiving feedback from one or more users indicating whether or not the summary is accurate and updating the text generation model based on the received feedback.

In some examples, for each abstractive action item generated, the operations further include predicting, using a due-date prediction model, based on the respective group of the one or more of the extractive action items associated with the same respective task, a due date for completing the respective task. Here, presenting the information related to the corresponding abstractive action item includes presenting the predicted due date for completing the respective task. Moreover, while presenting the respective summary of the corresponding abstractive action item, the operations may further include receiving feedback from one or more users indicating whether or not the prediction of the due date for completing the respective task is accurate and updating the assignee prediction model based on the received feedback.

Another aspect of the disclosure provides a system that includes data processing hardware and memory hardware in communication with the data processing hardware and storing instructions that when executed on data processing hardware causes the data processing hardware to perform operations that include obtaining a transcript of multiple dialog acts during a multi-party communication session and extracting, from the transcript, a plurality of extractive action items each associated with a task expected to be completed within a timeframe to begin after the multi-party communication session ends. The operations also includes generating, using an abstractive action item identification model configured to receive the extractive action items extracted from the transcript, one or more abstractive action items. Each abstractive action item is associated with a respective group of one or more of the extractive action items that are associated with a same respective task. For each of the one or more abstractive action items, the operations also include presenting, in one or more graphical user interfaces, information related to the corresponding abstractive action item.

This aspect may include one or more of the following optional features. In some implementations, extracting the plurality of extractive action items includes: for each of the multiple dialog acts of the transcript, classifying, using an action item classification model configured to receive a respective sequence of dialog acts that includes the corresponding dialog act, the corresponding dialog act as either comprising an action item or not comprising an action item; and identifying each dialog act classified as comprising an action item as a respective one of the plurality of action items. Here, the action item classification model may include a pre-trained Bidirectional Encoder representations from Transformers (BERT) model or an extended transformer construction (ETC) model having a global-local attention mechanism.

In some examples, the abstractive action item identification model is trained on a set of training transcripts each including: a sequence of training dialog acts each corresponding to a transcribed utterance spoken by a single speaker during a multi-party communication; and one or more ground-truth abstractive action items. Here, each ground-truth abstractive action item indicates a respective span of sequential dialog acts from the sequence of training dialog acts that collectively indicate a respective task to be completed, one or more particular individuals responsible for completing the respective task, and a due date for completing the respective task. In these examples, a first dialog act and a last dialog act in the respective span of sequential dialog acts indicated by the ground-truth abstractive action item may each be associated with extractive action items. For instance, at least one dialog act between the first dialog act and the second dialog act in the respective span of sequential dialog acts may not be associated with an extractive action item. Additionally, generating the one or more abstractive action items may include clustering the extractive action items into one or more coherent groups, wherein each coherent group forms a respective one of the one or more abstractive action items.

In some implementations, the operations further include, for each abstractive action item generated, generating, using a text generation model, based on the respective group of the one or more extractive action items associated with the same respective task, a respective summary of the abstractive action item that concisely describes the respective task to be completed. In these implementations, presenting the information related to the corresponding action item includes presenting the respective summary of the corresponding abstractive action item. Moreover, while presenting the respective summary of the corresponding abstractive action item, the operations may further include receiving feedback from one or more users indicating whether or not the summary is accurate and updating the text generation model based on the received feedback.

In some examples, for each abstractive action item generated, the operations further include predicting, using a due-date prediction model, based on the respective group of the one or more of the extractive action items associated with the same respective task, a due date for completing the respective task. Here, presenting the information related to the corresponding abstractive action item includes presenting the predicted due date for completing the respective task. Moreover, while presenting the respective summary of the corresponding abstractive action item, the operations may further include receiving feedback from one or more users indicating whether or not the prediction of the due date for completing the respective task is accurate and updating the assignee prediction model based on the received feedback.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
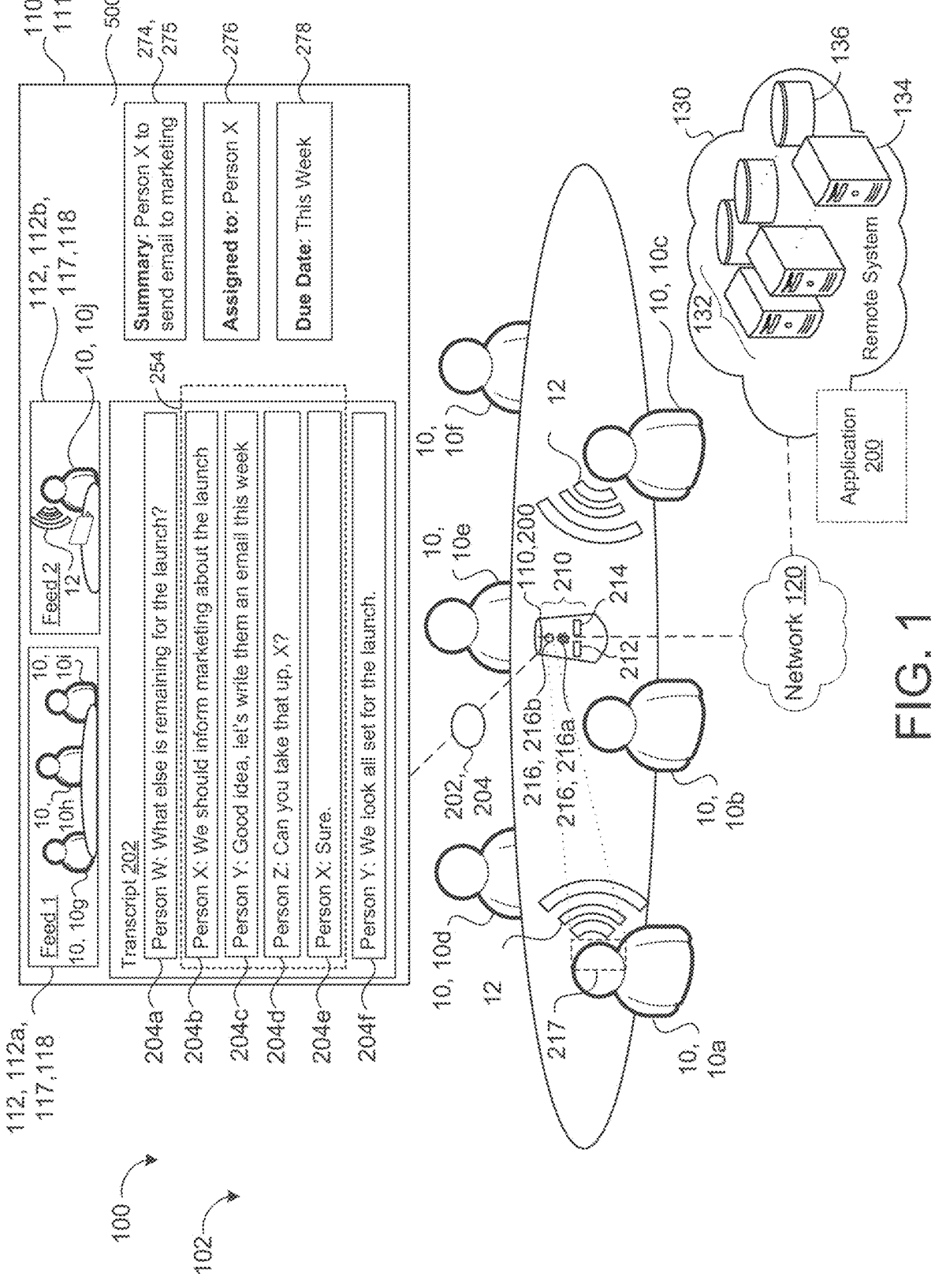
FIG. 1 is a schematic view of an example system including a note taking application configured to detect abstractive action items from a transcript of multiple dialogs spoken during a multi-party communication session.

Action items capture the information decided in a meeting, and serve as an essential component of professional communications for stakeholders to align and agree on next steps. Participants in a meeting generally indicate action items to be the most important information in the meeting, rendering automated action item identification an often requested feature for notes-taking applications.

Employees in some workplaces attend an average of 17 meetings totaling 12 hours per week. On an average, these meetings may have around three or four action items each associated with a different task to complete by an assigned individual or group of individuals. Not only does writing these action items down during the meeting distract the meeting participants' concentration, it breaks the flow of conversation and wastes precious synchronous time. Reliable action item identification systems may help participants improve productivity and relieve stress of not taking during meetings.

Computer-implemented technologies can assist users in organizing and completing tasks, and in particular, performing action items resulting from events, such as meetings. For example, some technologies, such as task lists or to-do lists applications, are configured to receive manual input from users, such as meeting notes, the topic of a meeting, or date of the meeting, and store, in computer memory, the input so that the user can refer back to the information in a static graphically displayed format. However, in addition to requiring manual input from users, the stored information and the user interface functionality of these technologies are limited. Generally, such solutions do not provide functionality for intelligently presenting action items to a user, among other things.

While some existing note-taking applications are capable of identifying action items from dialog, these applications rely on binary classification of a dialog indicating whether an utterance does or does not include an action item, and fail to leverage the context of all the prior utterances/dialogs spoken when making an action item classification. For instance, many existing action item identification systems use hotword-based triggers for identifying and recording action items. This narrow focus limits the usefulness of the system and the value delivered to the end user since there is no ability to cluster extractive action item dialogs into coherent groups, generate a subsequent description of the action item, predict assignees and due dates for completing the action item identified. Some existing note-taking applications may even employ learning models to detect action items automatically, but generally lack the importance of transcription context and do not leverage modern natural language processing techniques for action item classification, assignee detection, and due date prediction. These existing note-taking products and technologies also lack techniques to address low training data availability for training realistic learning models for domain-specific dialogs that may specific to an organization or type of meeting.

Referring to FIG. 1, a system 100 includes a plurality of participants 10, 10*a-j* participating in a multi-party communication session 102. The examples herein depict the multi-party communication session 102 as a meeting, however the system 100 may be equally applicable to other types of multi-party communication sessions such as, without limitation, legal proceedings, interactive workshops, lectures, and remote learning where instructors assign homework to students to be completed by due dates. In the example shown, six participants 10*a-f* are attending a meeting (e.g., a video conference) with in a host meeting room. The system 100 includes a remote system 130 and a computing device 110 that receives a content feed 112 (also referred to as a multi-media feed, a content stream, or a feed) via a network 120 from a remote system 130. The content feed 112 may be an audio feed 218 (i.e., audio data 218 such as audio content, an audio signal, or audio stream), a visual feed 217 (i.e., image data 217 such as video content, a video signal, or video stream), or some combination of both (e.g., also referred to as an audio-visual feed, an audio-visual signal, or an audio-visual stream). The computing device 110 includes, or communicates with, a display 111 capable of displaying video content 217 and a speaker for audible output of the audio content 218. Some examples of a computing device 110 include a computer, a laptop, a mobile computing device, a television, a monitor, a smart device (e.g., smart speaker, smart display, smart appliance), a wearable device, etc. In some examples, the computing device 110 includes audio-visual feeds 112 of other participants attending the meeting from other locations remote from the host meeting room. For example, FIG. 1 depicts two feeds 112, 112*a-b* where each feed 112 corresponds to a different remote meeting room. Here, the first feed 112*a* includes three participants 10, 10*g-i* while the second feed 112*b* includes a single participant 10, 10*j* (e.g., an employee working remotely from a home office). Notably, each of the participants 10*a-f* may include their own respective computing device 110 or share one or more computing devices 110 within the host meeting room at the Chicago office. Similarly, each of the participants 10*g-i* may include their own respective computing device 110 or share one or more computing devices 110 within the meeting room from the New York office. Continuing with the example, the first feed 112*a* may correspond to a feed 112 from the New York office, the second feed 112*b* corresponds to a feed 112 from the San Francisco office, and the host meeting room corresponds to the Chicago office.

The remote system 130 may be a distributed system (e.g., cloud computing environment or storage abstraction) having scalable/elastic resources 132. The resources 132 include computing resources 134 (e.g., data processing hardware) and/or storage resources 136 (e.g. memory hardware). In some implementations, the remote system 130 hosts software that coordinates the multi-party communication session 102 (e.g., on the computing resources 132). For instance, the computing resources 132 of the remote system 130 execute software, such as a real-time communication application or a specialty meeting platform.

With continued reference to FIG. 1, the system 100 also includes a note taking application (hereinafter "application" or "app") 200. The application 200 is configured to predict extractive action items 254 from a transcript 202 of multiple dialog acts 204, 204*a-n* during the multi-party communication 102 and predict one or more abstractive action items 274 each associated with a respective group of one or more of the extractive action items 254 that are associated with a same respective task. Each dialog act 204 in the transcript 202 may be associated with a respective segment of the transcript 202 spoken by a particular speaker/participant 10 of the communication session 102. That is, adjacent dialog acts 204 indicate speaker turns. As used herein, an "action item" refers to a task or goal requested during the communication session 102 that is to be completed at some point after the communication session 102. Action items may collectively include a subset of decisions taken during the multi-party communication 102 such as an extensive discussion leading to a decision that results in an individual commitment. Dialog acts 204 may be classified as acts about information exchange, acts about possible actions/tasks, comments on a previous discussion, social acts, and/or special tags for labeling non-intentional acts, e.g., backchannels uch as "um" and "uh-huh" attempts to maintain the floor.

The note taking application 200 may cluster extractive action items 254 into coherent groups each associated with a respective abstractive action item 274 that represents a key idea/next step of the goal or task to be completed arising from the extractive action items 254 during the communication session 102. For each abstractive action item 274 predicted, the application 200 may use the clustered coherent group of extractive action items 254 to generate/create a respective summary 275 of the abstractive action item 274 that concisely describes/summarizes the task or goal to be completed, identify/predict an assignee 276 (e.g., one or more individuals) responsible for performing the abstractive action item 274, and identity/predict a due date 278 for completing the abstractive action item 274. The assignee 276 may include a participant in the multi-party communication, or may include another individual(s) not participating the in the multi-party communication 102

An action item may be issued via a command or request by a person to have another person(s) or themselves perform a particular task. Similarly, an action item may also be issued via an acknowledgement by a person affirming that he/she will perform the particular task indicated by one or more extractive action items previously extracted from corresponding prior dialogs 204 of the transcript 202. For instance, consider a first dialog act 204a spoken by person W: "What else is remaining for the launch"; a second dialog act 204b spoken by person X: "We should inform marketing about the launch"; a third dialog act 204c spoken by person Y: "Good idea, let's write them an email this week"; a fourth dialog act 204d spoken by person Z: "Can you take that up, X?"; a fifth dialog act 204e spoken by person X: "Sure"; and a sixth dialog act 204f spoken by person Y: "We look all set for the launch!" In this scenario, the second through fifth dialog acts 204b-e include extractive action items 254 extracted from the transcript 202 and clustering them together into a coherent group permits the application 200 to predict a corresponding abstractive action item 274 and generate the corresponding summary 275 "Person X will inform marketing about the launch". Using context provided by the extractive action items 254 forming the abstractive action item 274, the application 200 also identifies/predicts the due date 278, this week (e.g., within seven (7) days), and the assignee 276, Person X. The assignee 276 and/or due date 278 may optionally be conveyed in the summary 275.

The summary 275, assignee 276, and due date 278 may each be referred to as "information related to the corresponding abstractive action item 274". In some examples, the application 200 presents the information 275, 276, 278 related to each corresponding abstraction action item 274 in a graphical user interface 500 displayed on the display 111. The application 200 may present the information 275, 276, 278 in multiple GUIs 500 each displayed on a respective display 111 associated with a different participant. That is, the application 200 may present the application in the GUI of the respective display 111 of each computing device 110. The information related to each corresponding abstraction item 274 could also be accessed via one or more computing devices 110 after the meeting ends for presentation in respective GUIs 500 displayed on displays 111 of the computing devices 110.

In the above example of dialog acts 204a-f, suppose that person X in the fifth dialog act 204e instead replied: "You know what? I already informed marketing about the launch last week". In this scenario, the dialog act 204e instead indicating that that the action item 254 is completed will result in the application 200 foregoing the need to generate any abstractive action item 274 since there is no task to complete due to person X indicating that he/she previously informed marketing about the launch prior (e.g., last week) to the communication session 102. As a result, the extractive action items 254 extracted from dialogs 204b-e may not be displayed on the display 111 of the participants computing device(s) 110 since there is no related action item to be completed. Thus, even though context may indicate that the dialogs 204b-e should be clustered together into a coherent group related to a common task to be completed, the dialog act 204f indicating that the common task is already completed triggers the application 200 to not generate an abstractive action item. Notably, the application would not clutter the display 111 with extractive action items 254 that are in fact detected, but later contexts in fact reveals that there is no corresponding task to complete.

Figure 2:
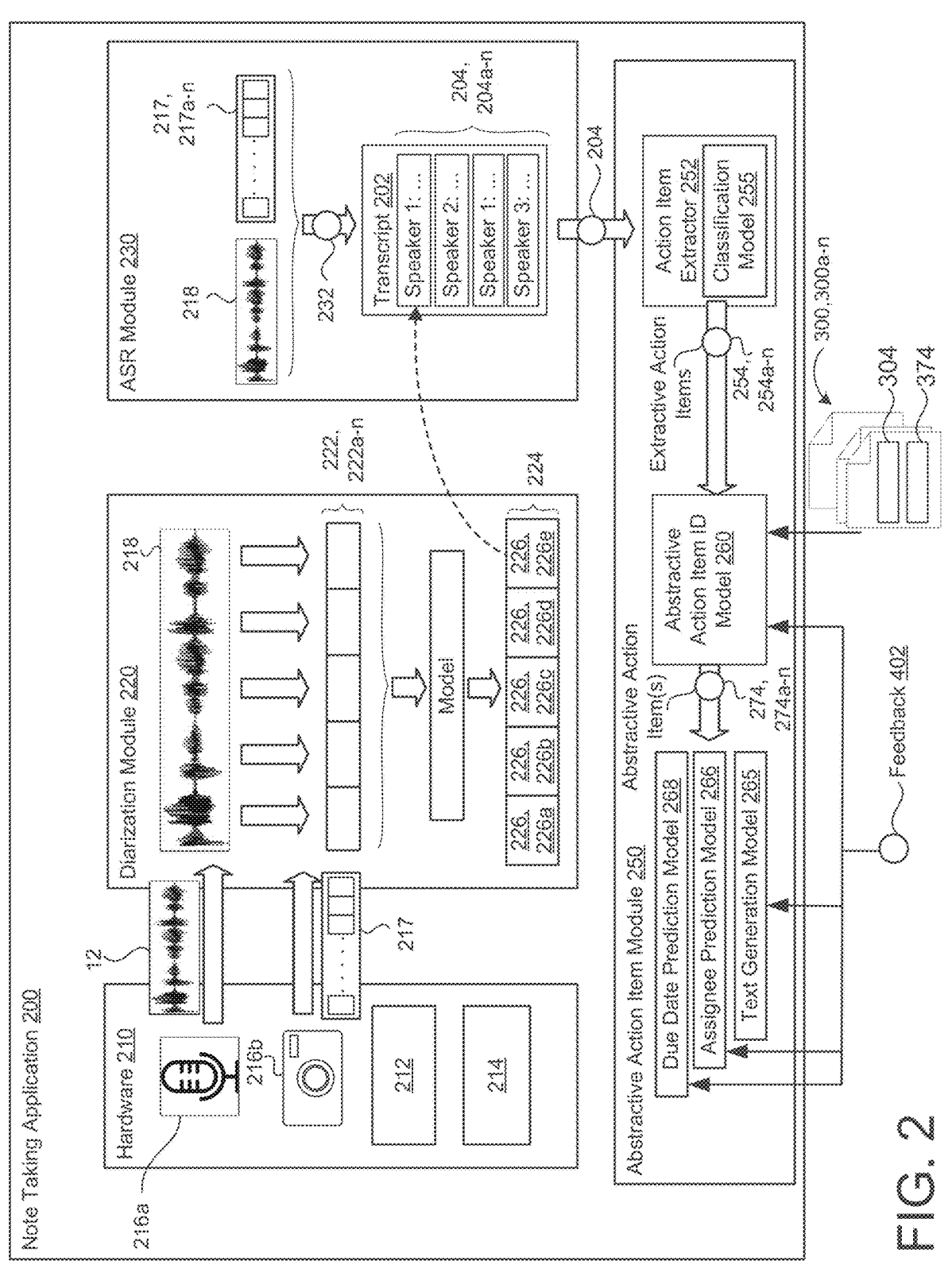
FIG. 2 is an example of components of the note taking application of FIG. 1.

FIG. 2 shows an example note taking application 200 including a hardware module 210, a diarization module 220, an automated speech recognition (ASR) module 230, and an abstractive action item module 250. The ASR module 230 is configured to generate a transcript 202 for the content spoken during the multi-party communication 102. In some examples, the computing device(s) 110 communicate one or more content feeds to the application 200. In some implementations, the application 200 receives the same content feed 112 as the computing device(s) 110. In other words, each computing device 110 may function as an extension of the application 200 by receiving the audio and video feeds of the content feed 112. For instance, the computing device 110 may include hardware 210 such data processing hardware 212 and memory hardware 214 in communication with the data processing hardware 212 that cause the data processing hardware 212 to execute the application 200. In this relationship, the application 200 may receive the content feed 112 (e.g., audio and visual content/signals 218, 217) through a network connection rather than only audibly capturing the audio content/signal 218 relayed through a peripheral of the computing device 110, such as speakers. In some examples, this connectivity between the application 200 and the computing device 110 enables the application 200 to seamlessly display, on the display/screen 111 of the computing device 110, the transcript 202, dialog actions 204, extractive action items 254, and any of the information 275, 276, 278 related to abstractive action items 274 generated by the application 200. In other configurations, the application 200 is located in the same local environment as the computing device 110, but corresponds to a computing device separate from the computing device 110. In these configurations, the application 200 communicates with the computing device 110 via a wired or wireless connection. Additionally or alternatively, the application 200 may be configured with an input/output (I/O) device such that audio and/or visual signals coordinated by the I/O device are channeled to the application 200 (e.g., in addition to the computing device 110).

In some implementations, the application 200 is configured with processing capabilities (e.g., processing hardware/ software) to process the audio and video content 112 and generate the transcript 202 when the content 112 is being presented during the multi-party communication 102. In other words, the application 200 is configured to process content 112 (e.g., audio and/or visual content 218, 217) locally at the computing device(s) 110 to generate the transcript 202 without any additional remote processing (e.g., at the remote system 130). Here, this type of processing is referred to as on-device processing. Unlike remote processing that often uses low fidelity, compressed video on server-based applications due to bandwidth constraints, on-device processing may be free of bandwidth constraints and thus allow the application 200 to utilize more accurate high definition video with high fidelity when processing visual content. Moreover, this on-device processing may allow an identity of a speaker/participant 10 to be tracked in real-time without delays due to latency that may occur if audio and/or visual signals 218, 217 were, in some degree, remotely processed (e.g., in the remote computing system 130 connected to the application 200). In order to process content at the application 200, the application 200 executes on the hardware 210 such as the data processing hardware 212 and the memory hardware 214 in communication with the data processing hardware 212. Some examples of data processing hardware 212 include a central processing unit (CPU), a graphics processing unit (GPU), or a tensor processing unit (TPU).

In some implementations, the application 200 executes on the remote system 130 by receiving content 112 (audio and video data 217, 218) from each of the first and second feeds 112a-b, as well as a feed 112 from the meeting room environment. For instance, the data processing hardware 134 of the remote system 130 may execute instructions stored on the memory hardware 136 of the remote system 130 for executing the application 200. Here, the application 200 may process the audio data 218 and image data 217 to generate the transcript 202. For example, the application 200 may generate and transmit the transcript 202 (and other information 204, 254, 274, 275, 276, 278) over the network 120 to one or more computing devices 110 for display thereon, e.g., in respective GUIs 500.

The hardware 210 may further include peripherals 216. For instance, in order to process audio content, the application 200 receives sounds captured by an audio capturing device 216, 216a (e.g., a microphone) and converts the sound into an audio signal 218 (or audio data 218). The audio signal 218 may then be used by the diarization module 220 and the ASR module 230.

In some examples, the peripherals also include an image capturing device 216, 216b. Here, the image capturing device 216b (e.g., one or more cameras) may capture image data 217 as an additional source of input (e.g., a visual input) that, in combination with an audio signal 218, aids in identifying which participant 10 in the multi-party communication 102 is speaking (i.e., a speaker). In other words, by including both the audio capturing device 216a and the image capturing device 216b, a diarization module 220 may increase its accuracy for speaker identification by leveraging image data 217 captured by image capturing device 216b to identify visual features (e.g., facial features) that indicate which participant 10, among the multiple participants 10a-10j, is speaking (i.e., generating utterances 12) at a particular instance.

Additionally or alternatively, using image data 217 assist the ASR module 230 for improving accuracy of the transcript 202 when a participant 10 has a speech disability. For instance, the ASR module 230 may have difficulty generating a transcript for a speaker with a speech disability that causes the speaker to have issues articulating speech. To overcome inaccuracies in the transcript 202 caused by such articulation issues, the ASR module 230 may be made aware of the articulation issue during generation of the transcript 202. By being aware of the issue, the ASR module 230 may accommodate for the issue by leveraging image data 217 representing the face of the participant 10 while speaking to generate an improved, or otherwise more accurate, transcript 202 than if the transcript 202 were based on the audio data 218 of the participant 10 alone. Moreover, techniques may be employed where image data 217 can be analyzed to correlate the lip motion of participants 10 with particular speech disorders into the speech intended by these participants 10 to thereby improve automatic speech recognition in ways that would not be possible using audio data 218 alone.

The diarization module 220 is configured to receive audio data 218 that corresponds to the utterances 12 from the participants 10 of the communication 102 (and optionally image data 217 representing faces of the participants 10 of the communication session, segment the audio data 218 into a plurality of segments 222, 222a-n (e.g., fixed-length segments or variable-length segments), and generate diarization results 224 that include a corresponding speaker label 226 assigned to each segment 222 using a probability model (e.g., a probabilistic generative model) based on the audio data 218 (and optionally the image data 217). In other words, the diarization module 220 includes a series of speaker recognition tasks with short utterances (e.g., segments 222) and determines whether two segments 222 of a given conversation were spoken by the same participant 10. Simultaneously, the diarization module 220 may simultaneously execute a face tracking routine to identify which participant 10 is speaking during which segment 222 to further optimize speaker recognition. The diarization module 220 is then configured to repeat the process for all segments 222 of the conversation. Here, the diarization results 224 provide time-stamped speaker labels 226, 226a-e for the received audio data 218 that not only identify who is speaking during a given segment 222, but also identify when speaker changes occur between adjacent segments 222. Here, the speaker labels 226 may identify dialog acts 204 within the transcript 202.

The ASR module 230 is configured to receive the audio data 218 corresponding to the utterances 12 (and optionally the image data 217 representing faces of the participants 10 while speaking the utterances 12). The ASR module 230 transcribes the audio data 218 into corresponding ASR results 232. Here, the ASR result 232 refers to a textual transcription of the audio data 218 (e.g., the transcript 202). In some examples, the ASR module 230 communicates with the diarization module 220 to utilize the diarization results 224 associated with the audio data 218 for improving speech recognition based on utterances 12. For instance, the ASR module 230 may apply different speech recognition models (e.g., language models, prosody models) for different speakers identified from the diarization results 224. Additionally or alternatively, the ASR module 230 and/or the diarization module 220 (or some other component of the application 200) may index a transcription 202 of the audio data 218 using the time-stamped speaker labels 226 predicted for each segment 222 obtained from the diarization results 224. Stated differently, the ASR module 230 uses the speaker labels 226 from the diarization module 220 to identify the dialog acts 204 for speakers within the transcript 202. As shown in FIG. 1, the transcript 202 for the multi-party communication 102 may be indexed by speaker/participant 10 to associate portions of the transcript 202 with the respective speaker/participant 10 in order to identify what each speaker/participant 10 said.

The abstractive action item module 250 obtains/receives the transcript 202 of multiple dialog acts 204, 204a-n during the multiparty communication session 102. The abstractive action item module 250 includes an action item extractor 252 that extracts, from the transcript 202, a plurality of extractive action items 254, 254a-n each associated with a task expected to be completed within a time frame to begin after the multi-party communication session 102 ends. For each dialog act 204 of the transcript 202, the action item extractor 252 is configured to output a binary classification result indicating whether or not the corresponding dialog act 204 includes an action item. The extractor 252 may output a score for each dialog act 204 and classify the dialog act 204 when the score satisfies a threshold.

Implementations herein are directed toward the action item extractor 252 executing an action item classification model 255 that is capable of leveraging the context of other dialog acts 204 in the transcript 202 when determining whether the corresponding dialog act 204 includes the action item 254. For instance, the action item classification model 255 may receive a respective sequence of dialog acts 204 that includes the corresponding dialog and generate a classification output that classifies the corresponding dialog act as either including the action item 254 or not including the action item 254. Here, the extractor 252 may identify each dialog act 204 classified by the classification model 255 as including an action item as a respective one of the plurality of action items 254 extracted from the transcript 202. Referring to the previous example of FIG. 1, the classification model 255 would classify the dialog acts 204*b-e* as including action items 254 and would classify each of the dialog acts 204*a*, 204*f* as not including any action items.

In some implementations, the action item classification model 254 includes a pre-trained Bidirectional Encoder representations from Transformers (BERT) model. The BERT model may include a 12 hidden layer encoder and use an uncased natural language pre-processor to generate tokens for the encoder. As used herein, the pre-processor applies a tokenizer on the textual representation of each dialog act 204 as tok(utt$_i$). The encoder inputs may also be conditioned on two parameters, a max_left_tokens and a maximum sequence length, max_seq_length. In some examples, the largest allowed value for max_seq_length is equal to 512. For each dialog act 204, utt$_i$, to be classified, the following two segments segment$_{utti}$ and segment$_{contexti}$ are constructed as follows:

$$segment_{utt_i} = tok(utt_i)$$

$$segment_{contex_i} = tok(utt_{i-j}), \ldots$$

$$tok(utt_{i-2}), tok(utt_{i-1}),$$

$$[SEP],$$

$$tok(utt_{i+1}), tok(utt_{i+2}),$$

$$\ldots tok(utt_{i+k})$$

where [SEP] includes a standard separator token. Details of the BERT model are described in "BERT: Pre-training of deep bidirectional transformers for language understanding", in *Proceedings of the* 2019 *Conference of the North American Chapter of the Association for Computational Linguistics: Human Language Technologies*, https://arxiv.org/abs/1810.04805, the contents of which are incorporated by reference in its entirety.

Moreover, since one additional [SEP] apart from the standard two tokens required by BERT models, j and k are obtained as follows:

$$\left[ \sum_{p=i-j}^{i-1} len(tok(utt_p)) \right] \leq max\_left\_tokens$$

$$\left[ \sum_{p=i-j}^{i+k} len(tok(utt_p)) \right] \leq max\_seq\_length - 3$$

Thereafter, segment$_{utti}$ and segment$_{contexti}$ are passed may be passed as the 1st and 2nd segment inputs to the pre-processor for constructing the following token sequence [CLS], segment$_{utti}$, [SEP], segment$_{contexti}$, [SEP]. The pre-processor may trim pad this sequence based on the max_seq_length as needed. All tokens in segment$_{utti}$ may be assigned input_type_ids 0, while all tokens in segment$_{contexti}$ may be assigned input_type_ids 1.

The BERT model may only use segment$_{utti}$=tokenize (utti) for the dialog act classification tasks. Moreover, the encoder output for the [CLS] token from the final layer may be used as the representation of the utterance. Here, the representation of the utterance may be fed to a series of sense layers and an Adam optimizer for generating the classification result indicating whether the token utti includes or does not include an extractive action item 254. To summarize, the BERT model may be configured to receive, as input, a first segment corresponding to the corresponding dialog act and a second segment corresponding to respective sequences of dialog acts occurring before and after the corresponding dialog act, and generate, as output, a classification result indicating whether the dialog act includes the action item or does not include the action item.

In some other implementations, the action item classification model 254 includes an extended transformer construction (ETC) model having a global-local attention mechanism. Like the BERT model, the ETC model may be configured to receive, as input, lexical features of the corresponding dialog act and one or more dialog acts surrounding the corresponding dialog act in the transcript, and generate, as output, the classification result indicating whether the dialog act includes the action item or does not include the action item. The ETC model may combat quadratic memory growth complexities associated with BERT models by introducing sparsity to the attention mechanism via the global-local attention mechanism. Similar to other sparse transformers, it allows encoding long sequences by utilizing a sparse local attention but has the additional benefit of modeling structure directly through nodes in the global attention layer which correspond to semantically meaningful structures, such as dialog acts or conversational turns. The ETC architecture's sparse local attention, called long-to-long, allows it to scale to long sequences of up to N tokens but limits the number of neighboring tokens an individual token can attend to. To overcome this, three other attention parts are used: global-to-global, global-to-long and long-to-global, all with unrestricted attention. They are built using an auxiliary global input which serves as an inductive bias feature. Through the global input nodes, tokens arbitrarily apart are able to attend to each other. In some examples, the long-to-long sparse local attention of the ETC architecture scales to long sequences of up to 4096 tokens (e.g., about 12 minutes of transcript)

With continued reference to FIG. 2, after the action item extractor 252 extracts the plurality of extractive action items 254 from the transcript 202, an abstractive action item identification model 260 generates one or more abstractive action items 274. Here, each abstractive action item 274 is associated with a respective group of one or more of the extractive action items 254 that are associated with a same respective task. For instance, the abstractive action item ID model 260 may perform a clustering operation that clusters the extractive action items 254 into one or more coherent groups each forming a respective one of the one or more abstractive action items 274. The clustering operation may be fine-tuned depending on the type of communication session, e.g., an all hands meeting may have different types of action items than a one-on-one meeting between a manager and a subordinate.

Solely using binary classification techniques for detecting action items often results in a failure to capture the continuous, long form nature of action items, and also failure to capture any connection between action item detection and abstractive action item generation. Implementations herein are directed toward training the abstractive action item ID model 260 on a set of training transcripts 300, 300*a-n* each including a corresponding sequence of training dialog acts 304 and one or more corresponding ground-truth abstraction action items 374. Each training dialog act 304 may correspond to a transcribed utterance spoken by a single speaker during a multi-party communication. Each ground-truth abstraction item 374 may indicate a respective span of sequential dialog acts 304 from the sequence of training dialog acts 304 that collectively indicate a respective task to be completed, an assignee (one or more individuals) responsible for completing the task, and a due date for completing the respective task.

Figure 3:
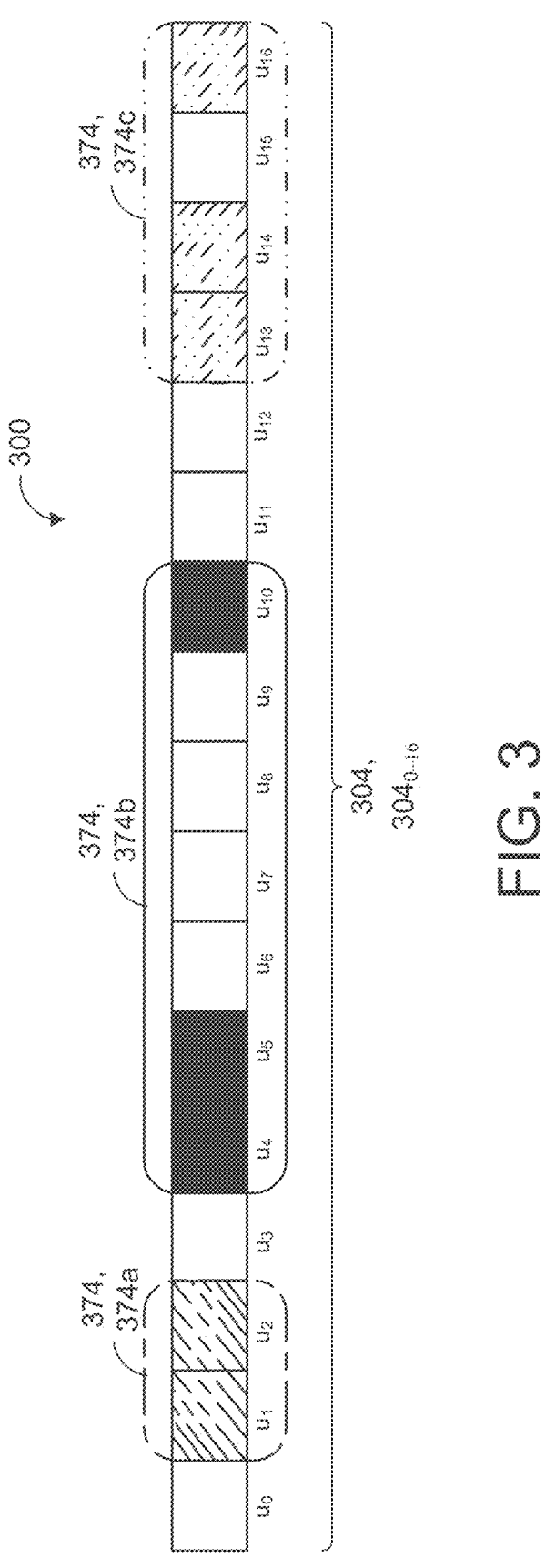
FIG. 3 includes an example training transcript including ground-truth abstractive action items.

FIG. 3 shows an example training transcript 300 including a sequence of training dialog acts 3040-16 corresponding to transcribed utterances spoken by individual speakers and three ground-truth abstractive action items 374, 374*a-c* each associated with a different respective task to be completed and indicating a different respective span of sequential dialog acts 304. For instance, the ground-truth abstractive action item 374*a* includes the span of sequential dialog acts 3041-2, the ground-truth abstractive action item 374*b* includes the span of sequential dialog acts 3044-10, and the ground-truth abstractive action item 374*c* includes the span of sequential dialog acts 30413-16. A first dialog act and a last dialog act in each of span of sequential dialog acts indicated by each corresponding ground-truth abstractive action item 374 are associated with positive extraction action item labels. In some scenarios, such as the span of sequential dialog acts 3044-10 associated with the second ground-truth abstraction item 374*b*, at least one dialog act (e.g., dialog acts 3046-9) between the first dialog act (e.g., dialog act 3044) and the second dialog act (e.g., dialog act 30410) in the respective span is not associated with a positive extraction item label.

Figure 4:
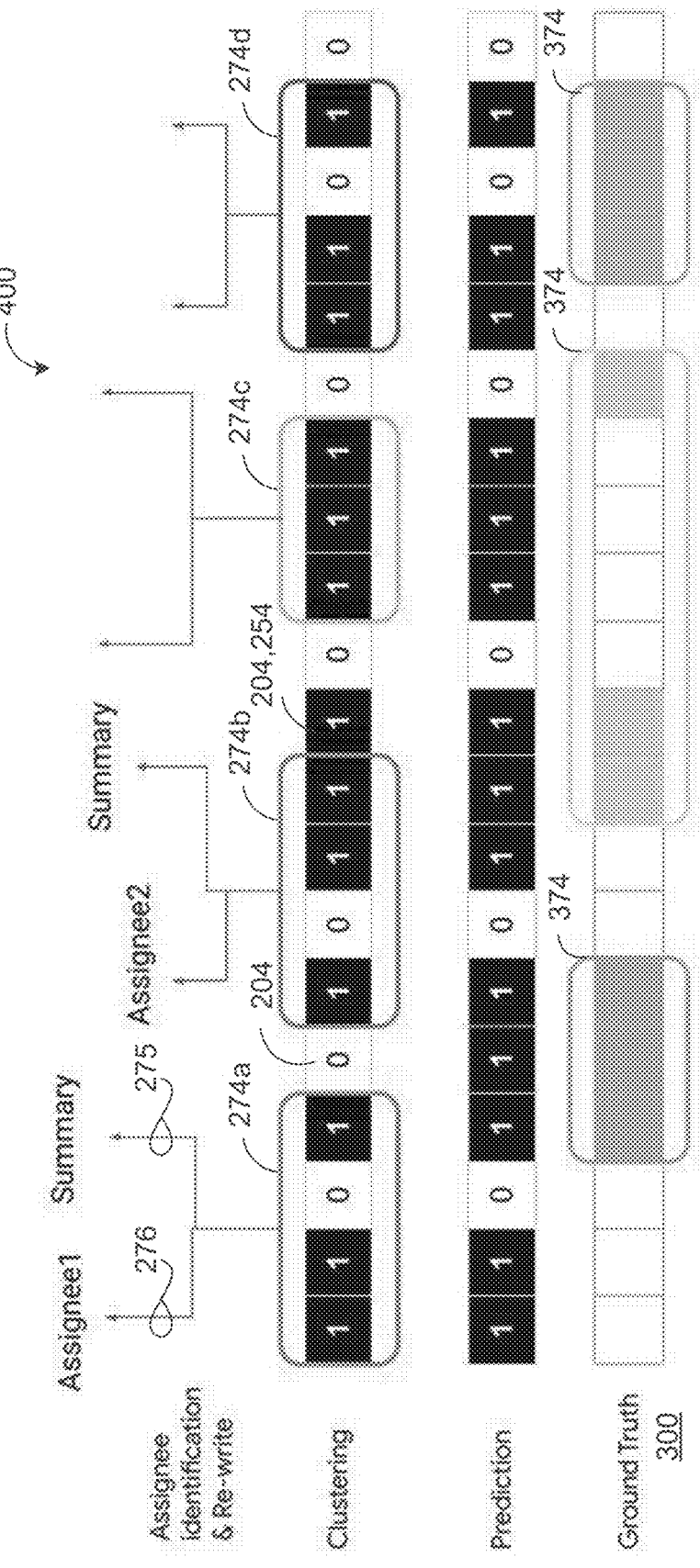
FIG. 4 shows a schematic view depicting a ground-truth training transcript, a prediction of extractive action items extracted from multiple dialog acts, and abstractive action items formed by clusters of coherent groups of the extractive action items.

FIG. 4 shows a schematic view 400 depicting a ground-truth training transcript 300, a prediction of extractive action items 254 extracted from a transcript of multiple dialog acts 204, and results of the clustering operation performed by the abstractive action item ID model 260 to cluster the predicted extractive action items 254 into coherent groups each forming a respective one of one or more predicted abstractive action items 274, 274*a-d*. The dialog acts 204 classified as "1" indicate extractive action items 254 predicted by the action item classification model 254, while the dialog acts 204 classified as "0" indicate dialog acts 204 that do not include extractive items. For each predicted abstractive action item 274 generated, a respective summary 275 of the abstractive action item 274 is generated that concisely describes the respective task to be completed as described above with reference to FIG. 2. FIG. 4 also shows that for each predicted abstractive action item 274 generated, an assignee 276 responsible for completing the respective task is predicted. While not shown in the example of FIG. 4, a due date 278 (FIGS. 1 and 5) may also be predicted for each abstractive action item 274 predicted. As described above in FIG. 3, the ground-truth training transcript 300 includes ground-truth abstractive action items 374 each associated with a different respective task to be completed and indicating a different respective span of sequential dialog acts 304. The abstractive action item ID model 260 may be trained to learn how to produce predicted abstractive action items 274 that align exactly with the ground-truth abstractive action items 274.

Training the abstractive action item ID model 260 may include applying a Generalized Hamming Distance (GHD) between the ground-truth abstraction items in each training transcript 300 and the predicted extractive action items and predicted abstractive action items output by the abstractive action item ID model 260. Notably, GHD applies partial credit for near misses alleviating shortcoming due to difficulties in defining segment boundaries. More specifically, GHD includes an edit distance metric that measures a minimum number of operations needed to arrive at the ground-truth abstractive action items from the predicted abstractive action items. In GHD, only shift, insert, and delete operations are allowed.

In some examples, the action item classification model 255 is also trained on the set of training transcripts 300. In these examples, the classification model and the abstractive action item ID model 260 may be trained jointly.

Referring back to FIG. 2, for each abstractive action item generated, a text generation model 265 may generate, based on the respective group of the one or more extractive action items 254 associated with the same respective task, a respective summary 275 of the abstractive action item 274 that concisely describes the respective task to be completed. In some examples, the text generation model includes a text-to-text transformer transfer (T5) model that generates the summary 275 based on lexical features in the respective group of the one or more extractive action items 254. As shown in FIG. 1, the application 200 presents, in one or more GUIs 500, the respective summary (e.g., "Person X to send email to marketing") 275 of a corresponding abstractive action item 274.

Moreover, for each abstractive action item 274 generated, an assignee prediction model 266 may predict, based on the respective group of the one or more extractive action items 254 associated with the same respective task, an assignee 276 (one or more specific individuals) responsible for completing the respective task. The assignee 276 may include participants 10 of the communication session 102 and/or other individuals who are not one of the participants 10 of the communication session 102. The predicted assignee may include the name of a specific individual. As shown in FIG. 1, the application 200 presents, in the one or more GUIs 500, the predicted assignee (e.g., Person X) 276 responsible for completing the respective task.

Additionally, for each abstractive action item 274 generated, using a due-date prediction model 268 may predict, based on the respective group of the one or more extractive action items 254 associated with the same respective task, a due date 278 for completing the respective task. As shown in FIG. 1, the application 200 presents, in the one or more GUIs 500, the predicted due date (e.g., This Week) 278 for completing the respective task. The due-date prediction model 268 may be configured to only output a subset of classes for strong classification results. The classes may include, without limitation, Due Immediately, Due in 7 days/Due this week, Due in 30 days/Due this month, Due in 90 days, Due this quarter.

Sourcing sufficient labeled data, such as the set of training transcripts 300, for training can be difficult. The application 200 may engage in an active-learning environment to fine-tune and update one or more of the models 255, 260, 265, 266, 266, 268 of the abstractive action item module 250. Referring to FIGS. 2 and 5A-5C, while presenting the information related to the corresponding abstractive action item 274 in the one or more GUIs 500, the GUIs may receive user feedback 402 indicating whether or not the generated/predicted information 275, 276, 278 is accurate. The feedback 402 may be used to update at least one of the abstractive action item ID model 260, the text generation model 265, the assignee prediction model 266, or the due date prediction model 268. Notably, multiple users corresponding to the participants 10 of the multi-party communication session may provide user input indications as corresponding feedback 402 indicating whether or not the presented information predicted is accurate. The feedback 402 may correspond to positive or negative training labels for the predicted information based on the underlying extractive action items 254 used to make the predictions.

Figures 5A, 5B, 5C:
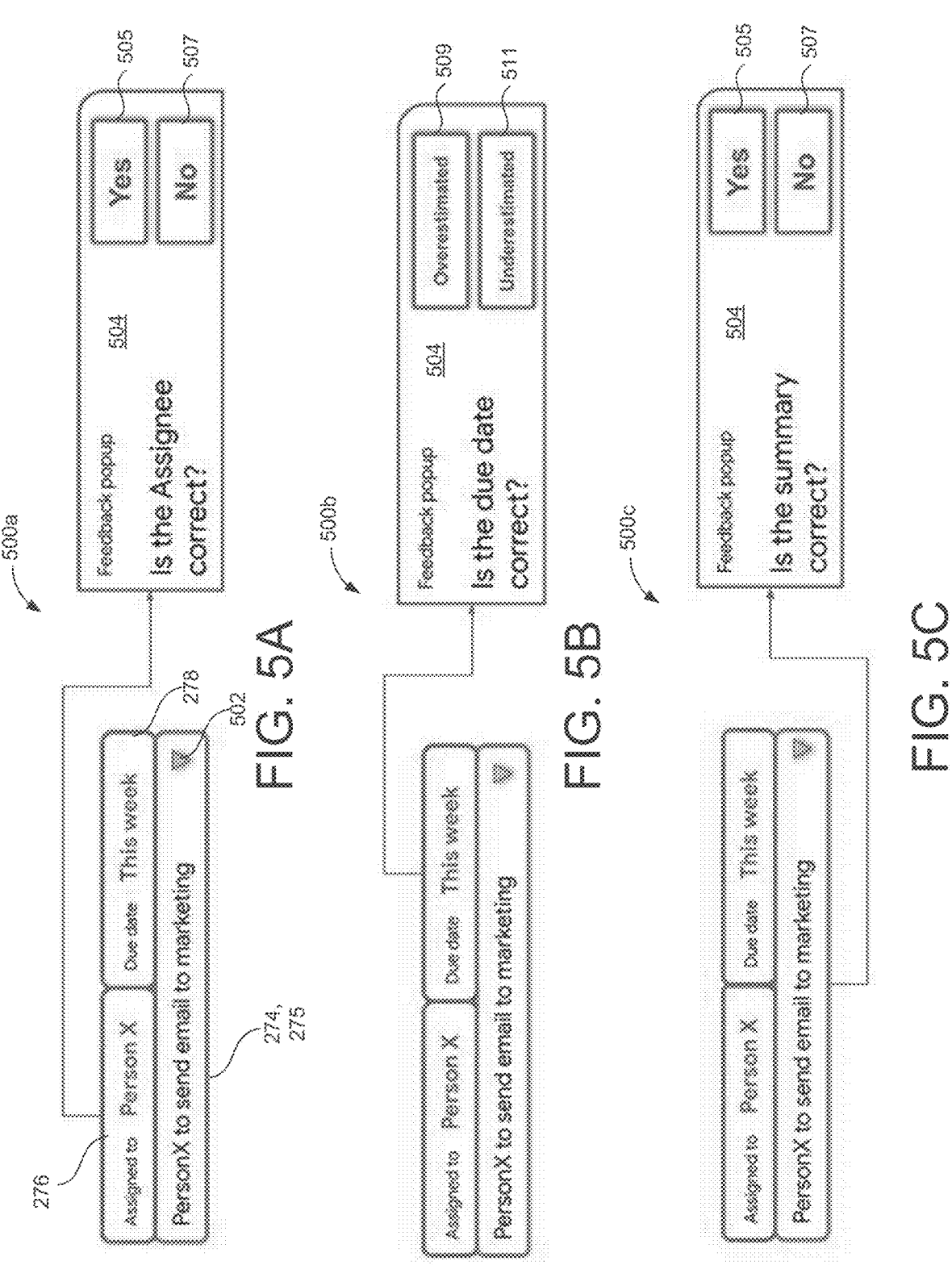
FIGS. 5A-5C show example graphical user interfaces each presenting a summary, assignee, and due date related to a corresponding abstractive action item.

FIGS. 5A-5C show example GUIs 500a-c each presenting a summary (e.g., "Person X to send email to marketing") 275 of a corresponding abstractive action item 274, the predicted assignee (e.g., Person X) 276 responsible for completing the abstractive action item, and the predicted due date (e.g., This Week) 278 for completing the abstractive action item 274. The summary 275 may include a dropdown element 502, that when selected, causes the GUI to present the list of underlying group of extractive action items 254 forming the corresponding abstract action item 274.

FIG. 5A shows the GUI 500a presenting a feedback popup 504 that permits a user to provide feedback 402 indicating whether or not the predicted assignee is correct/ accurate. For instance, the user may provide a user input indication to select a "Yes" graphical button or a "No" graphical button presented in the feedback popup.

FIG. 5B shows the GUI 500b presenting a feedback popup that permits a user to provide feedback 402 indicating whether the predicted due date 278 is correct/accurate. For instance, the user may provide a user input indication to select an "overestimated" graphical button or an "underestimated" graphical button presented in the feedback popup 504. No selection may be user acquiescence that the predicted due date 278 is correct. While not show, the feedback popup could additionally or alternatively present "Yes" and "No" graphical buttons.

FIG. 5C shows the GUI 500c presenting a feedback popup 504 that permits a user to provide feedback 402 indicating whether the predicted assignee 276 is correct/accurate. For instance, the user may provide a user input indication to select a "Yes" graphical button or a "No" graphical button presented in the feedback popup.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 6:
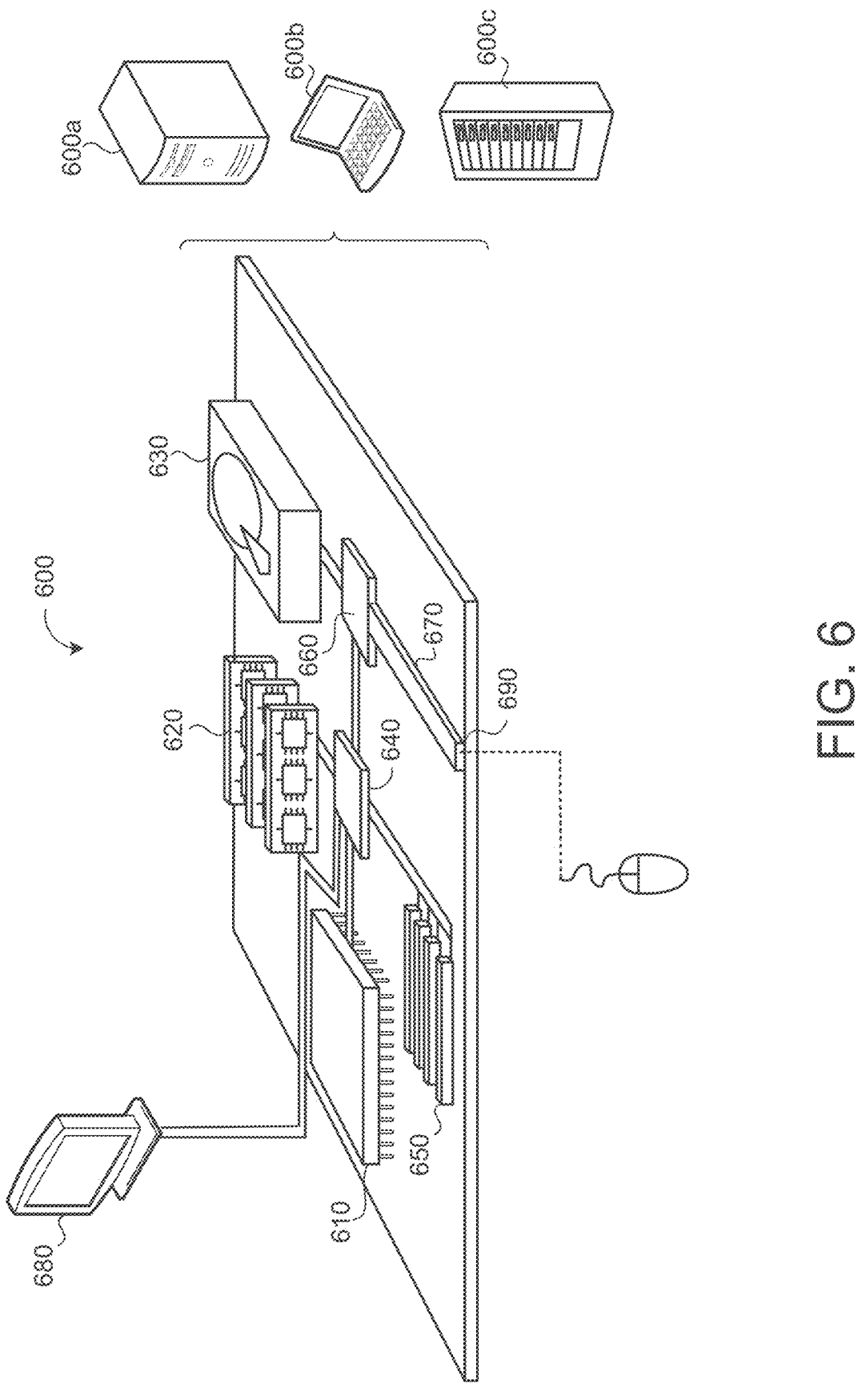
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/ controller 640 connecting to the memory 620 and high-speed expansion ports 650, and a low speed interface/ controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 may be referred to as data processing hardware 610 and may include the data processing hardware 212, 134 of the user computing device 110 or the remote system 130. The processor 610 can process instructions for execution within the computing device 600, including instructions stored in the memory 620 or on the storage device 630 to display graphical information for a graphical user interface (GUI) on an external input/ output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be referred to memory hardware 620 and include the memory hardware 214, 136 of a user computing device 110 or the remote system 130. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Figure 7:
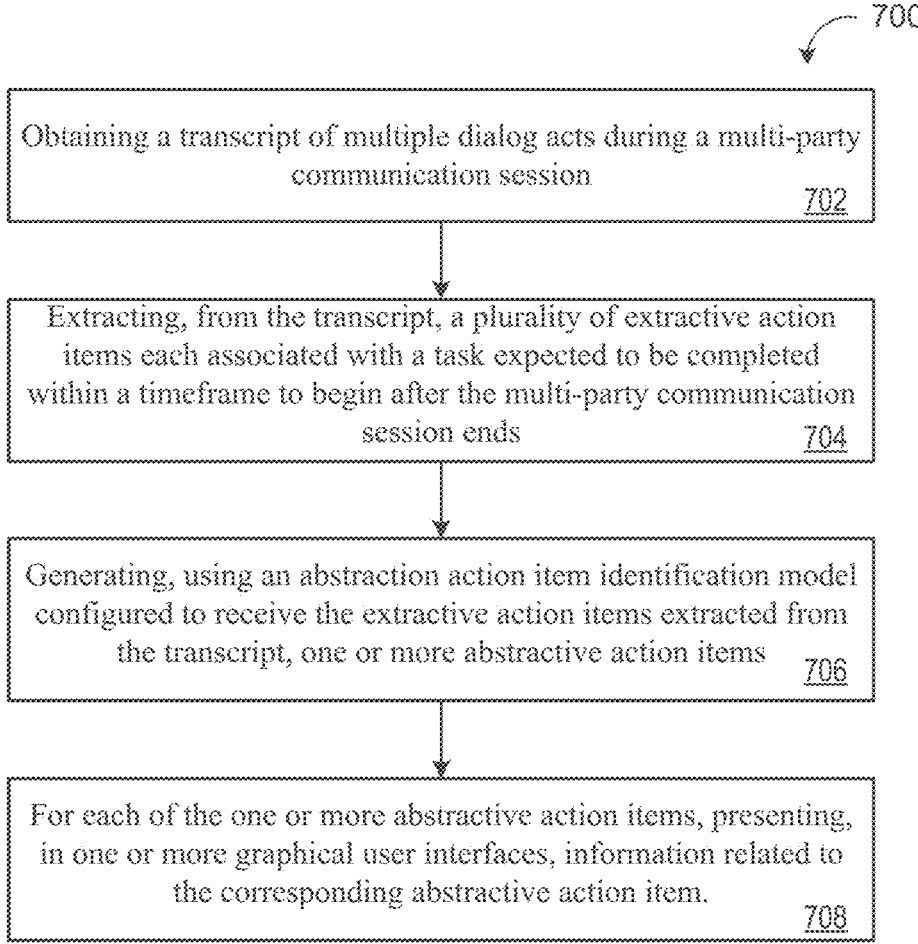
FIG. 7 is a flowchart of an exemplary arrangement of operations for a method of detecting abstractive action items from a transcript.

FIG. 7 is a flowchart of an example arrangement of operations for a method 700 of generating abstractive action items 274 from a transcript 202. The method 700 may execute on the data processing hardware 610 based on instructions for the operations stored on the memory hardware 620. At operation 702, the method 700 includes obtaining the transcript 202 of multiple dialog acts 204 during a multi-party communication session 102. At operation 704, the method 700 includes extracting, from the transcript 202 a plurality of extractive action items 254 each associated with a task expected to be completed within a timeframe to begin after the multi-party communication session ends 102.

At operation 706, the method 700 includes generating, using an abstractive action item identification model 260 configured to receive the extractive action items 254 extracted from the transcript 202, one or more abstractive action items 274. Each abstractive action item 274 is associated with a respective group of one or more of the extractive action items 254 that are associated with a same respective task.

At operation 708, for each of the one or more abstractive action items 274, the method 700 also includes presenting, in one or more graphical user interfaces 500, information related to the corresponding abstractive action item 274. The information may include, without limitation, an assignee 276, a due date 278, and/or a summary 275 of the corresponding abstractive action item 274.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations comprising:

as each particular dialog act of multiple dialog acts during a multi-party communication session occurs:

obtaining corresponding audio data representing the particular dialog act;

processing, using a trained automatic speech recognition module, the corresponding audio data to obtain a corresponding transcript of the particular dialog act;

extracting, using an action item extractor model, from the corresponding transcript of the particular dialog act, a corresponding extractive action item associated with a task expected to be completed within a timeframe to begin after the multi-party communication session ends, the action item extractor model comprising a first machine learning (ML) model trained to:

receive, as input, the corresponding transcript of the particular dialog act and corresponding transcripts of a respective sequence of dialog acts occurring before and after the particular dialog act;

process, using a tokenizer, the corresponding transcript of the particular dialog act to generate a corresponding sequence of tokens representing the particular dialog act; and process the corresponding sequence of tokens to generate, as output, a corresponding classification result indicating whether the particular dialog act includes an action item or does not include an action item;

generating, using an abstractive action item identification model configured to receive the corresponding extractive action items extracted by the action item extractor model, one or more abstractive action items, at least one abstractive action item of the one or more abstractive action items representing a respective group of two or more of the corresponding extractive action items, each extractive action item of the respective group of two or more extractive action items representing a respective aspect of a same respective action item task, at least two of the respective group of two or more extractive action items associated with different dialog acts, the abstractive action item identification model comprising a second ML model trained using a plurality of training transcripts, each training transcript of the plurality of training transcripts comprising:

a corresponding sequence of training dialog acts; and one or more corresponding ground-truth abstraction actions for the corresponding sequence of training dialog acts, at least one ground-truth abstraction action of the one or more corresponding ground-truth abstraction actions indicating a span of sequential dialog acts that includes a first dialog act and a second dialog act both associated with a single task, and one or more intervening dialog acts between the first dialog act and the second dialog act that are not associated with the single task;

generating, using a text generation model, a summary of the at least one abstractive action item representing the respective group of two or more of the extractive action items based on lexical features of the respective group of two or more of the extractive action items, the summary concisely describing the respective action item task to be completed;

for each particular abstractive action item of the one or more abstractive action items, presenting, during the multi-party communication session in one or more graphical user interfaces, information related to the particular abstractive action item;

receiving user feedback indicating whether or not the presented information related to the particular abstractive action item is accurate, the user feedback corresponding to a positive or a negative training label for the presented information; and fine-tuning the abstractive action item identification model based on the user feedback.

2. The computer-implemented method of claim 1, wherein the first ML model comprises a pre-trained Bidirectional Encoder representations from Transformers (BERT) model.

3. The computer-implemented method of claim 1, wherein the first ML model comprises an extended transformer construction (ETC) model having a global-local attention mechanism.

4. The computer-implemented method of claim 1, wherein each training transcript further comprises one or more ground-truth abstractive action items, each ground-truth abstractive action item indicating a respective span of sequential dialog acts from the sequence of training dialog acts that collectively indicate a respective task to be completed, one or more particular individuals responsible for completing the respective task, and a due date for completing the respective task.

5. The computer-implemented method of claim 4, wherein an initial dialog act and a last dialog act in the respective span of sequential dialog acts indicated by the ground-truth abstractive action item are each associated with extractive action items.

6. The computer-implemented method of claim 5, wherein at least one dialog act between an initial dialog act and a last dialog act in the respective span of sequential dialog acts indicated by the ground-truth abstractive item is not associated with an extractive action item.

7. The computer-implemented method of claim 1, wherein generating the one or more abstractive action items comprises clustering the corresponding extractive action items into one or more coherent groups, each coherent group forming a respective one of the one or more abstractive action items.

8. The computer-implemented method of claim 1, wherein presenting the information related to the at least one abstractive action item comprises presenting the summary of the at least one abstractive action item.

9. The computer-implemented method of claim 8, wherein the operations further comprise:

while presenting the summary of the at least one abstractive action item, receiving feedback from one or more users indicating whether or not the summary is accurate; and updating the text generation model based on the received feedback.

10. The computer-implemented method of claim 1, wherein the operations further comprise:

predicting, using an assignee prediction model, based on the respective group of the two or more of the extractive action items associated with the same respective action item task, one or more individuals responsible for completing the respective action item task of the at least one abstractive action item, wherein presenting the information related to the at least one abstractive action item comprises presenting the predicted one or more individuals responsible for completing the respective action item task.

11. The computer-implemented method of claim 10, wherein the operations further comprise:

while presenting the predicted one or more individuals, receiving feedback from one or more users indicating whether or not the prediction of the one or more individuals responsible for completing the respective action item task is accurate; and updating the assignee prediction model based on the received feedback.

12. The computer-implemented method of claim 1, wherein the operations further comprise:

predicting, using a due-date prediction model, based on the respective group of the two or more of the extractive action items associated with the same respective action item task, a due date for completing the respective action item task of the at least one abstractive action item, wherein presenting the information related to the at least one abstractive action item comprises presenting the predicted due date for completing the respective action item task.

13. The computer-implemented method of claim 12, wherein the operations further comprise:

while presenting the predicted due date, receiving feedback from one or more users indicating whether or not the prediction of the due date for completing the respective action item task is accurate; and updating an assignee prediction model based on the received feedback.

14. A system comprising:

data processing hardware; and memory hardware in communication with the data processing hardware, the memory hardware storing instructions that, when executed on the data processing hardware, cause the data processing hardware to perform operations comprising:

as each particular dialog act of multiple dialog acts during a multi-party communication session occurs:

obtaining corresponding audio data representing the particular dialog act;

processing, using a trained automatic speech recognition module, the corresponding audio data to obtain a corresponding transcript of the particular dialog act;

extracting, using an action item extractor model, from the corresponding transcript of the particular dialog act, a corresponding extractive action item associated with a task expected to be completed within a timeframe to begin after the multi-party communication session ends, the action item extractor model comprising a first machine learning (ML) model trained to:

receive, as input, the corresponding transcript of the particular dialog act and corresponding transcripts of a respective sequence of dialog acts occurring before and after the particular dialog act;

process, using a tokenizer, the corresponding transcript of the particular dialog act to generate a corresponding sequence of tokens representing the particular dialog act; and process the corresponding sequence of tokens to generate, as output, a corresponding classification result indicating whether the particular dialog act includes an action item or does not include an action item;

generating, using an abstractive action item identification model configured to receive the extractive action items extracted by the action item extractor model, one or more abstractive action items, at least one abstractive action item of the one or more abstractive action items representing a respective group of two or more of the corresponding extractive action items, each extractive action item of the respective group of two or more extractive action items representing a respective aspect of a same respective action item task, at least two of the respective group of two or more extractive action items associated with different dialog acts, the abstractive action item identification model comprising a second ML model trained using a plurality of training transcripts, each training transcript of the plurality of training transcripts comprising:

a corresponding sequence of training dialog acts; and one or more corresponding ground-truth abstraction actions for the corresponding sequence of training dialog acts, at least one ground-truth abstraction action of the one or more corresponding ground-truth abstraction actions indicating a span of sequential dialog acts that includes a first dialog act and a second dialog act both associated with a single task, and one or more intervening dialog acts between the first dialog act and the second dialog act that are not associated with the single task;

generating, using a text generation model, a summary of the at least one abstractive action item representing the respective group of two or more of the extractive action items based on lexical features of the respective group of two or more of the extractive action items, the summary concisely describing the respective action item task to be completed;

for each particular abstractive action item of the one or more abstractive action items, presenting, during the multi-party communication session in one or more graphical user interfaces, information related to the particular abstractive action item receiving user feedback indicating whether or not the presented information related to the particular abstractive action item is accurate, the user feedback corresponding to a positive or a negative training label for the presented information; and fine-tuning the abstractive action item identification model based on the user feedback.

15. The system of claim 14, wherein the first ML model comprises a pre-trained Bidirectional Encoder representations from Transformers (BERT) model.

16. The system of claim 14, wherein the first ML model comprises an extended transformer construction (ETC) model having a global-local attention mechanism.

17. The system of claim 14, wherein each training transcript further comprises one or more ground-truth abstractive action items, each ground-truth abstractive action item indicating a respective span of sequential dialog acts from the sequence of training dialog acts that collectively indicate a respective task to be completed, one or more particular individuals responsible for completing the respective task, and a due date for completing the respective task.

18. The system of claim 17, wherein an initial dialog act and a last dialog act in the respective span of sequential dialog acts indicated by the ground-truth abstractive action item are each associated with extractive action items.

19. The system of claim 18, wherein at least one dialog act between an initial dialog act and a last dialog act in the respective span of sequential dialog acts indicated by the ground-truth abstractive item is not associated with an extractive action item.

20. The system of claim 14, wherein generating the one or more abstractive action items comprises clustering the corresponding extractive action items into one or more coherent groups, each coherent group forming a respective one of the one or more abstractive action items.

21. The system of claim 14, wherein presenting the information related to the at least one abstractive action item comprises presenting the summary of the at least one abstractive action item.

22. The system of claim 21, wherein the operations further comprise:

while presenting the summary of the at least one abstractive action item, receiving feedback from one or more users indicating whether or not the summary is accurate; and updating the text generation model based on the received feedback.

23. The system of claim 14, wherein the operations further comprise:

predicting, using an assignee prediction model, based on the respective group of the two or more of the extractive action items associated with the same respective action item task, one or more individuals responsible for completing the respective action item task of the at least one abstractive action item, wherein presenting the information related to the at least one abstractive action item comprises presenting the predicted one or more individuals responsible for completing the respective action item task.

24. The system of claim 23, wherein the operations further comprise:

while presenting the predicted one or more individuals, receiving feedback from one or more users indicating whether or not the prediction of the one or more individuals responsible for completing the respective action item task is accurate; and updating the assignee prediction model based on the received feedback.

25. The system of claim 14, wherein the operations further comprise:

predicting, using a due-date prediction model, based on the respective group of the two or more of the extractive action items associated with the same respective action item task, a due date for completing the respective action item task of the at least one abstractive action item, wherein presenting the information related to the at least one abstractive action item comprises presenting the predicted due date for completing the respective action item task.

26. The system of claim 25, wherein the operations further comprise:

while presenting the predicted due date, receiving feedback from one or more users indicating whether or not the prediction of the due date for completing the respective action item task is accurate; and updating an assignee prediction model based on the received feedback.

* * * * *